United States Patent [19]

Harvey

[11] Patent Number: 4,583,831
[45] Date of Patent: Apr. 22, 1986

[54] PSEUDO TELEPHOTO—PSEUDO PANORAMIC CAMERA

[75] Inventor: Donald M. Harvey, Webster, N.Y.

[73] Assignee: Eastman Kodak Company, Rochester, N.Y.

[21] Appl. No.: 717,053

[22] Filed: Mar. 28, 1985

[51] Int. Cl.$^4$ .......................... G03B 17/24; G03B 3/00
[52] U.S. Cl. .................................... 354/106; 354/195.1
[58] Field of Search ............... 354/105, 106, 109, 197, 354/195.1; 352/44, 92, 236; 355/40

[56] References Cited

U.S. PATENT DOCUMENTS

| | | | |
|---|---|---|---|
| 2,187,246 | 1/1940 | Nerwin | 88/1.5 |
| 3,200,699 | 8/1965 | Graves | 88/1.5 |
| 3,490,844 | 1/1970 | Sapp, Jr. | 355/40 |
| 4,195,924 | 4/1980 | Stemme et al. | 354/197 |
| 4,357,102 | 11/1982 | Taren et al. | 355/77 |
| 4,478,493 | 10/1984 | Yokota | 350/332 |

*Primary Examiner*—William B. Perkey
*Attorney, Agent, or Firm*—Roger A. Fields

[57] ABSTRACT

A photographic camera enables pseudo telephoto and pseudo panoramic prints to be obtained from normal exposures coded to identify the selected type print. In the camera, an objective lens is adjustable to vary its angular field of view within a field range having a wide angle limit and a telephoto limit. A manually operated member is movable to a plurality of positions corresponding to respective fields of view within the field range of the lens, for adjusting the lens to a selected field of view. Also, the manually operated member is movable to other positions corresponding to respective pseudo telephoto or pseudo panoramic fields of view outside the field range of the lens, when the lens is adjusted to the telephoto limit or the wide angle limit. Code means, responsive to movement of the manually operated member to a position corresponding to a pseudo telephoto or pseudo panoramic field of view, encodes an exposure taken with the lens at its wide angle or telephoto limit with indicia representative of the pseudo field of view. This enables the portion of the exposure covered by the pseudo field of view to be identified for enlargement printing to obtain a pseudo telephoto or pseudo panoramic print.

10 Claims, 11 Drawing Figures

FIG. 1

| OPERATING MODE | PSEUDO PAN. | ACTUAL ZOOM | PSEUDO TELE.(ZOOM) | | |
|---|---|---|---|---|---|
| ACTUAL FOCAL LENGTH (ACTUAL ZOOM POWER) | 28mm. | 28mm. to 80mm. (1.0X) (2.5X) | 80mm. (2.5X) | | |
| EQUIVALENT FOCAL LENGTH (EQUIVALENT ZOOM POWER) | 28mm. | same as actual | 112 mm. (3.5X) | 144 mm. (4.5X) | 200 mm. (6.5X) |
| FINDER IMAGE (WIDTH-TO-LENGTH RATIO) | (1:2) | (3½:5) | (3½:5) | (3½:5) | (3½:5) |
| PORTION OF NEGATIVE USED TO MAKE PRINT | 16.4 x 32.8mm. | 23 x 32.8 mm. | 16.4 x 23.4mm. | 12.8 x 18.3mm. | 9.2 x 13.1mm. |
| CODE FIDUCIAL | 1000 | 0000 | 0100 | 0010 | 0001 |
| PRINT SIZE | 3½ x 7 ins. | 3½ x 5 ins. | | | |

PSEUDO TELEPHOTO—PSEUDO PANORAMIC CAMERA

BACKGROUND OF THE INVENTION

1. Field of the Invention

The invention relates generally to photography. More particularly, the invention relates to a camera for enabling pseudo telephoto and pseudo panoramic prints to be obtained from normal exposures by coding an exposure to identify a selected type print.

2. Description of the Prior Art

A pseudo telephoto print is one that is made from a central portion of an exposure having the same width-to-length ratio, e.g., 3½:5, as that of the exposure. During the printing process, the negative is masked at its upper, lower, left and right marginal zones, leaving the central portion of the negative unmasked. Alternatively, the film gate in the enlarger may be correspondingly masked or adjusted. Then, an enlargement is made of the unmasked portion of the negative to provide a print with the same width-to-length ratio as that of the unmasked portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unmasked. Alternatively, the film gate in the enlarger may be correspondingly masked or adjusted. Then an enlargement is made of the unmasked portion of the negative to provide a print with the same width-to-length ratio as that of the unmasked portion. Thus, the print will have a panoramic or elongate format.

Commonly assigned U.S. Pat. No. 3,490,844, granted Jan. 20, 1970 discloses a method of making a print of a selected portion of a subject to be photographed. The method comprises the following steps: (1) viewing the subject in the viewfinder of a camera; (2) manually adjusting masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position in the viewfinder as a corresponding portion of the exposure, enlargement of the portion in the negative will provide a pseudo telephoto effect, similar to the actual telephoto effect provided by a telephoto lens. Thus, a pseudo telephoto print can be made during the printing process from an exposure taken without a telephoto lens.

U.S. Pat. No. 4,357,102 discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unmasked portion of the window. Printing paper with a similar width-to-length ratio is used. Prints can thus be obtained which have a panoramic format, without using a panoramic lens.

Although U.S. Pat. No. 3,490,844 discloses a method of making a pseudo telephoto print from an exposure taken without a telephoto lens, and U.S. Pat. No. 4,357,102 discloses a method of making a pseudo panoramic print from an exposure taken without a panoramic lens, in each instance the exposure is made using an objective lens having a fixed focal length, probably around 45 mm. or 50 mm. A 45 mm. or 50 mm. lens is a normal lens, as distinguished from a telephoto or wide angle lens, and is chosen for the camera to enable normal prints as well as pseudo telephoto or pseudo panoramic prints to be obtained. However, without the ability of the objective lens to range from a normal focal length, e.g., 50 mm., to at least a moderate telephoto focal length, e.g., 80 mm., or from the normal focal length to at least a moderate wide angle focal length, e.g., 35 mm., the pseudo telephoto or pseudo panoramic prints obtained cannot have much of a telephoto or panoramic effect. This is because the selected portion of the negative cannot be enlarged significantly from an exposure taken with a 50 mm. lens before the sharpness of the image is lost.

SUMMARY OF THE INVENTION

According to the invention, it is possible to obtain a pseudo telephoto print from an exposure taken with the objective lens set at a telephoto focal length and/or to obtain a pseudo panoramic print from an exposure taken with the objective lens set at a wide angle focal length. This is in addition to obtaining normal prints from exposures taken with the objective lens set at a normal focal length.

In one variation of the invention, the camera comprises:

(a) an objective lens adjustable to change its focal length to vary the angular field of view of the lens;

(b) manually operated means, supported for movement to a plurality of positions corresponding to respective focal lengths of the lens, for adjusting the lens to a selected focal length to take an exposure, and supported for movement to other positions corresponding to respective pseudo focal lengths associated with different fields of view narrower than the possible fields of view of the lens, when the lens is adjusted to its longest focal length; and (c) code means, responsive to movement of the manually operated means to a position corresponding to a pseudo focal length, for encoding an exposure taken with the lens at its longest focal length with indicia representative of the pseudo focal length, whereby the portion of the exposure covered by the angular field of view associated with the pseudo focal length can be identified to obtain a pseudo telephoto print.

In another variation of the invention, the camera enables pseudo panoramic prints as well as pseudo telephoto prints to be obtained from exposures. In this variation, the camera comprises:

(a) an objective lens adjustable to vary its angular field of view within a field range having a wide angle limit and a telephoto limit;

(b) manually operated means, supported for movement to a plurality of positions corresponding to respective fields of view within the field range of the lens, for adjusting the lens to a selected field of view to take an exposure, and supported for movement to other positions corresponding to respective pseudo panoramic or pseudo telephoto fields of view outside the field range, when the lens is adjusted to the wide angle limit or the telephoto limit; and (c) code means, responsive to movement of the manually operated means to a position corresponding to a pseudo panoramic or pseudo telephoto field of view, for encoding an exposure taken with the lens at its wide angle or telephoto limit with indicia representative of the pseudo field of view, whereby the portion of the exposure covered by the pseudo field can be identified to obtain a pseudo panoramic or pseudo telephoto print.

In a preferred embodiment of the invention, the manually operated means includes cam means coupled to the objective lens and movable with the manually operated means to adjust the lens to respective fields of view within the field range of the lens. The cam means has an elongate camming section and respective dwell sections at opposite ends of the camming section. The dwell sections permit the lens to remain stationary at its wide angle limit and its telephoto limit as the manually operated means is moved with the cam means to the positions corresponding to the pseudo panoramic and pseudo telephoto fields of view (outside the field range of the lens). Thus movement of the manually operated means beyond the telephoto limit of the lens encodes an exposure with pseudo telephoto indicia, and movement of the manually operated means beyond the wide angle limit of the lens encodes the exposure with pseudo panoramic indicia.

BRIEF DESCRIPTION OF THE DRAWINGS

The invention will be described in connection with the drawings, wherein.

DESCRIPTION OF THE PREFERRED EMBODIMENT

The invention is disclosed as being embodied in a single-lens-reflex (SLR) camera having a zoom lens. Because such a camera and lens are well known, this description is directed in particular to photogaphic elements forming part of or cooperating directly with the disclosed embodiment. It is to be understood, however, that other elements not specifically shown or descibed may take various forms known to persons of ordinary skill in the art.

Figure 1:
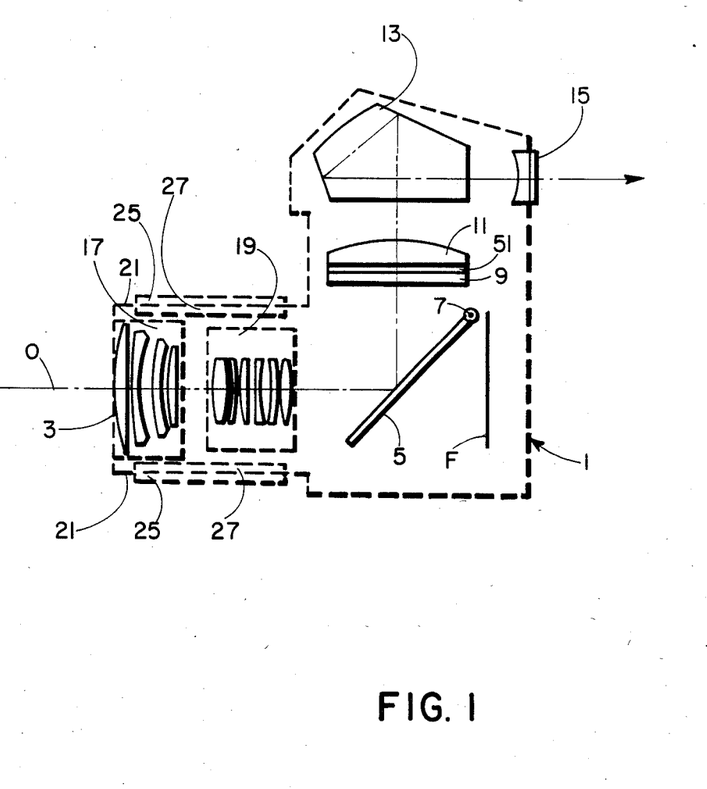
FIG. 1 is an elevation view of a single-lens-reflex (SLR) camera for use with 35 mm. film, illustrating the interaction of a zoom lens and a viewfinder in the camera.

Referring now to the drawings, and in particular to FIG. 1, there is shown a single-lens-reflex (SLR) camera 1 for use with conventional 35 mm. film. The camera 1 includes an objective lens 3 and known means, such as a pressure plate and a pair of rails, not shown, for supporting successive sections F of the film in the focal plane of the lens. Between the objective lens 3 and the film section F is a flip-up mirror 5 which is normally disposed at an angle of 45°, centered on the optical axis O of the lens, but can flip up about a pivot 7 to lie flat. When the mirror 5 is disposed at the 45° angle it reflects the rays of light that come through the objective lens 3, onto a ground glass screen 9 in the viewfinder of the camera. A field lens 11 and a penta-roof prism 13 in the viewfinder direct the light rays through an eyelens 15 at the rear of the camera to enable a subject to be photographed to be viewed through the objective lens 5. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9, and the light rays from the objective lens 3 fall on the film section F. The position of the mirror 5 is so arranged that when an image of the subject to be photographed is focused on the ground glass screen 9 with the mirror at the 45° angle, the same image falls into focus on the film section F when the mirror is flipped out of the way.

Finger pressure against a shutter release, not shown, on the outside of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 3:
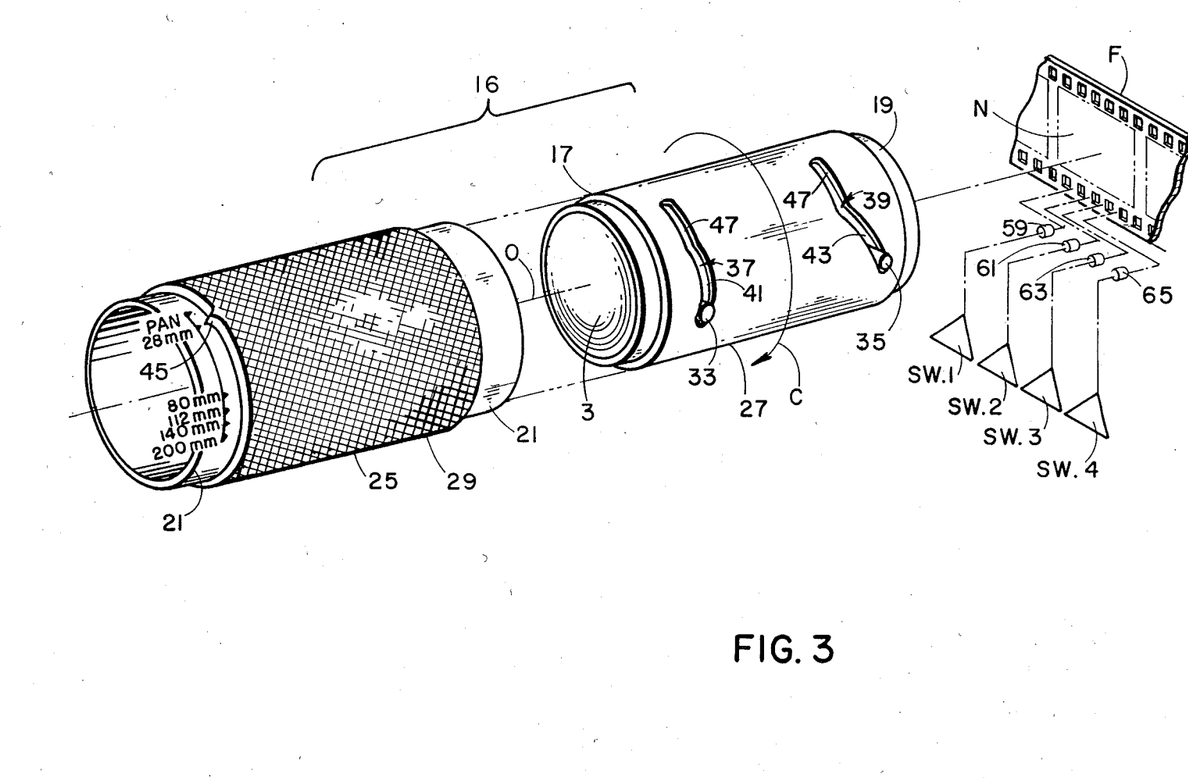
FIG. 3 is an exploded perspective view of the zoom lens and a zoom control for adjusting the lens.
Figure 4:
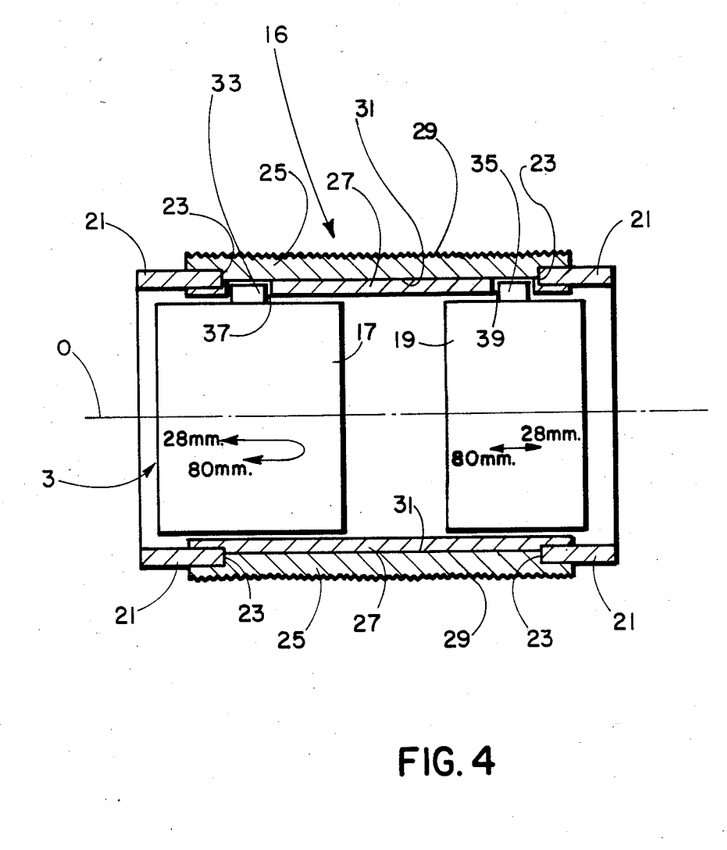
FIG. 4 is a partial sectional view of the zoom lens and the zoom control.

The objective lens 3 in the camera 1 is a zoom lens, that is, a lens of variable focal length which can be adjusted continuously by movement of separate groups of elements in the lens to change the focal length of the lens. This is done in order to vary the angular field of view (coverage) of the objective lens 3 between wide-angle and telephoto limits. Alternatively, a lens assembly may be provided having a plurality of interchangable elements for changing the focal length. As shown in FIGS. 1, 3 and 4, the objective lens 3 includes a front four-element section 17 which moves in a double action path along the optical axis O, first back (rearward) and then forward as the focal length of the lens is changed from a wide angle limit of, for example, 28 mm. to a telephoto limit of, for example, 80 mm. Conversely a rear six-element section 19 of the lens 3 moves forward along the optical axis O in an almost smooth, linear path as the focal length of the lens is adjusted from 28 mm. to 80 mm. At the shortest focal length of the lens 3, i.e., the wide-angle limit 28 mm., the front and rear sections 17 and 19 of the lens are farthest apart and the angular field of view is 75°. At the longest focal length of the lens 3, i.e., the telephoto limit 80 mm., the angular field of view is 28°.

Figure 5:
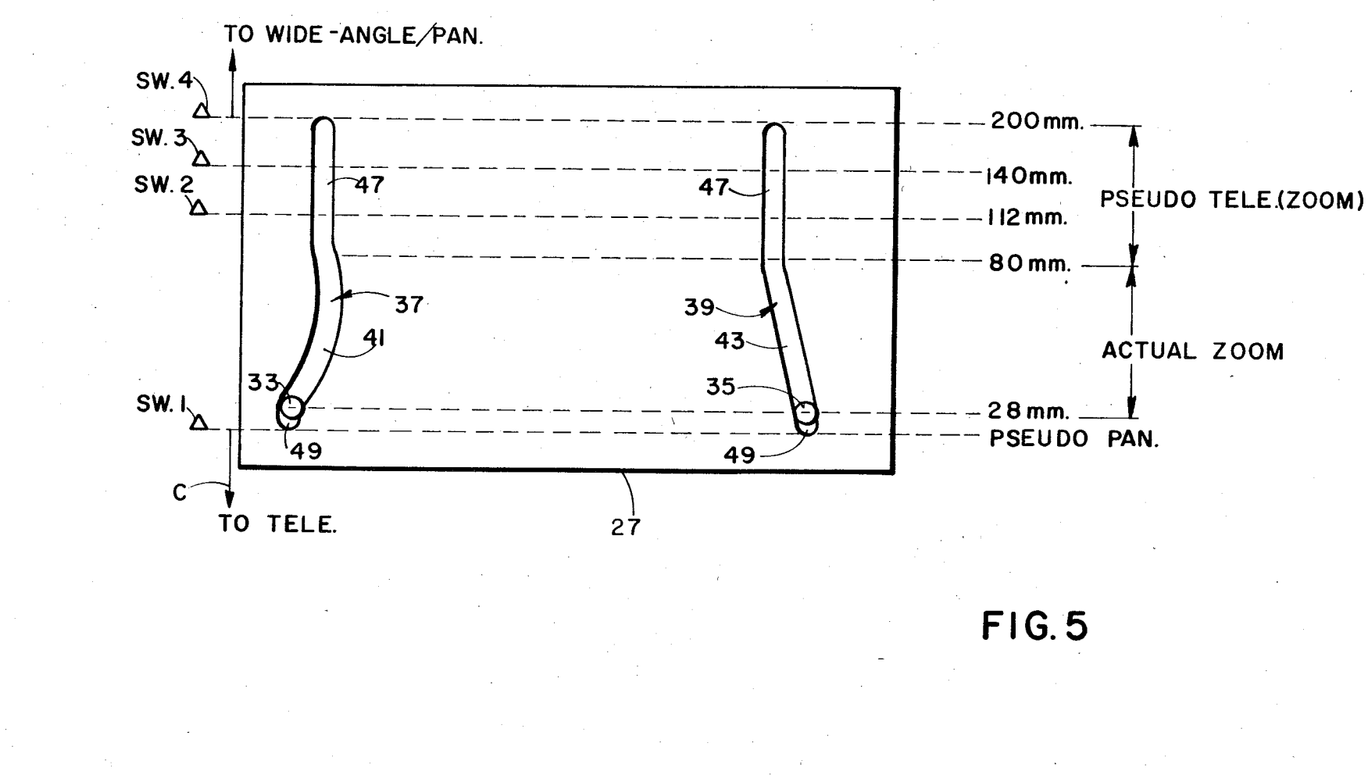
FIG. 5 is a plan view of a cam slot and cam follower in the zoom control.

Manually operated means 16 for moving the front and rear sections 17 and 19 of the objective lens 3 to adjust the lens to a selected focal length from 28 mm. to 80 mm. is shown in FIGS. 3-5. As seen in FIG. 4, a cylindrical barrel 21 houses the front and rear sections 17 and 19 of the lens 3. The barrel 21 has an annular opening 23 which is bridged in light-trapping relation by an exterior zoom ring 25 and an interior cam ring 27.

The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the lens 3. The front and rear sections 17 and 19 have respective cam followers 33 and 35 which project into different-shaped cam slots 37 and 39 in the cam ring 27, to adjust the lens 3 from its 28 mm. focal length to its 80 mm. focal length. The different shape of the cam slots 37 and 39, and respective settings of the cam ring 27 for adjusting the lens 3 to the 28 mm. focal length and the 80 mm. focal length, are depicted in FIG. 5. When, as viewed in FIGS. 3 and 5, the cam ring 27 is rotated in a clockwise direction C (by turning the zoom ring 25 in the same direction) from the 28 mm. setting to the 80 mm. setting of the cam ring, the front section 17 of the lens 3 first moves rearward and then moves forward because of a curved segment 41 of the cam slot 37. Simultaneously, the rear section 19 of the lens 3 simply moves forward because of a straight, inclined segment 43 of the cam slot 39. This movement of the front and rear sections 17 and 19 adjusts the lens 3 to continuously change its focal length from 28 mm. to 80 mm.

An arrow 45 is provided on the zoom ring 25 for alignment with respective indications of the 28 mm. and 80 mm. settings of the cam ring 27. As shown in FIG. 3, the indications are embossed on the outside of the cylindrical barrel 21.

As is apparent from FIG. 5, the cam ring 27 can be rotated in the clockwise direction C beyond its 80 mm. setting (by similarly turning the zoom ring 25) to a plurality of pseudo telephoto settings, 112 mm., 140 mm. and 200 mm., without moving the lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 28 mm. setting (by similarly turning the zoom ring 25) to a pseudo panoramic setting, without moving the lens 3 from its shortest (wide-angle) focal length 28 mm. This is possible because of respective, non-inclined, identical dwell segments 49 in the two cam slots 37 and 39. Indications of the pseudo telephoto settings and the pseudo panoramic setting of the cam ring 27 are embossed on the outside of the barrel 21 beyond the 28 mm. and 80 mm. indications on the barrel, for alignment with the arrow 45 on the zoom ring 25.

Figure 6A:
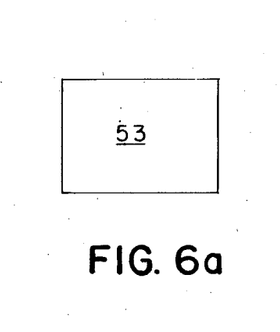
FIGS. 6A-6E are elevation views of the finder field in the viewfinder, illustrating operation of a liquid crystal display (LCD) masking unit for partially masking the viewing area in various degrees to frame a selected portion of the subject to be photographed.
Figure 6B:
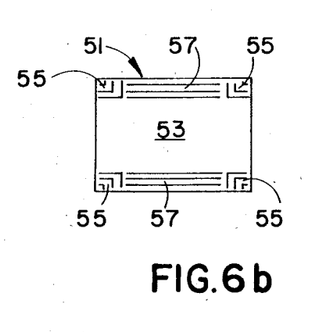
Figure 6C:
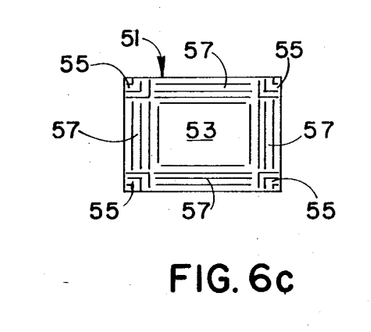
Figure 6D:
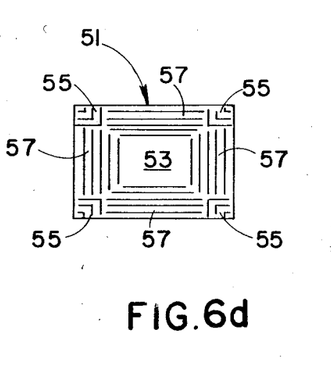
Figure 6E:
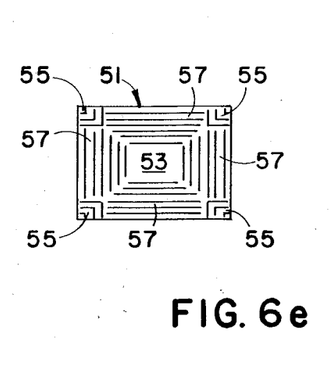

A liquid crystal display (LCD) masking unit 51 is located in the viewfinder of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 6B-6E in various masking configurations in the finder field 53 of the viewfinder. The respective configurations correspond to the pseudo panoramic and pseudo telephoto settings of the cam ring 27. As shown in FIG. 6E, the masking unit 51 comprises four sets of right-angle insulated strips 55 of transparent, electrically conductive material arranged in side-by-side relation in the respective corner zones of the finder field 53 and four sets of elongate insulated strips 57 of the same material arranged in side-by-side relation in the upper, lower, left and right marginal zones of the finder field. Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 6B-6E. FIG. 6A illustrates the finder field 53 as it appears with the masking unit 51 deenergized, when the cam ring 27 is rotated from its 28 mm. setting to its 80 mm. setting or vice-versa. In this instance, none of the right-angle strips 55 or the elongate strips 57 are visible in the finder field 53. FIG. 6B illustrates the finder field 53 as it appears with the masking unit 51 minimally energized to provide a pseudo panoramic format, when the cam ring 27 is in its pseudo panoramic setting. In this instance, three of the elongate strips 57 in the upper and lower marginal zones and all of the right-angle strips 55 in the corner zones are visible in the finder field 53. FIG. 6C illustrates the finder field as it appears with the masking unit further energized to provide a pseudo telephoto format akin to a 112 mm. focal length, when the cam ring is in its 112 mm. pseudo telephoto setting. In this instance, four of the elongate strips in the upper, lower, left and right marginal zones and all of the right-angle strips in the corner zones are visible in the finder field. FIG. 6D illustrates the finder field as it appears with the masking unit even further energized to provide a pseudo telephoto format akin to a 140 mm. focal length, when the cam ring is in its 140 mm. pseudo telephoto setting. In this instance, five of the elongate strips in the marginal zones and all of the right-angle strips in the corner zones are visible in the finder field. FIG. 6E illustrates the finder field as it appears with the masking unit completely energized to provide a pseudo telephoto format akin to a 200 mm. focal length, when the cam ring is in its 200 mm. pseudo telephoto setting.

In contrast to the electrically controlled LCD masking unit 51, a mechanically controlled masking unit may be provided in the viewfinder of the camera 1. An example of a mechanical unit is shown in U.S. Pat. No. 3,212,422, granted Oct. 19, 1965.

Four light emitting diodes (LED's) 59, 61, 63 and 65 are disposed in evenly spaced relation in the camera 1 for selective energization to spotexpose various code fiducials in binary form on the film section F adjacent the negative space N, as shown in FIG. 3. Selective energization of the LED's 59, 61, 63 and 65 is controlled by the closing of respective switches SW1, SW2, SW3 and SW4. The closing of a switch SW1, SW2, SW3 or SW4 may be effected by a closure member, not shown, on the cam ring 27 as the cam ring is positioned in one of its pseudo panoramic and pseudo telephoto settings. The binary form of the resulting code fiducial on the film section F indicates the particular pseudo setting of the cam ring 27. When the cam ring 27 is in its pseudo panoramic setting, the LED 59 is energized so that the binary form of the code fiducial is 1000. When the cam ring is in its 112 mm., 140 mm. or 200 mm. pseudo telephoto settings, the LED's 61, 63 or 65 are energized so that the binary form of the code fiducial is 0100, 0010 or 0001, respectively. When the cam ring is rotated from its 28 mm. setting to its 80 mm. setting or vice-versa, none of the LED's are energized so that the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial, for use in the printing process, and the LED's 61, 63 and 65 would provide the code fiducials. Thus, the various codings might be 1000, 1100, 1110 and 1111, for example.

Figure 2:
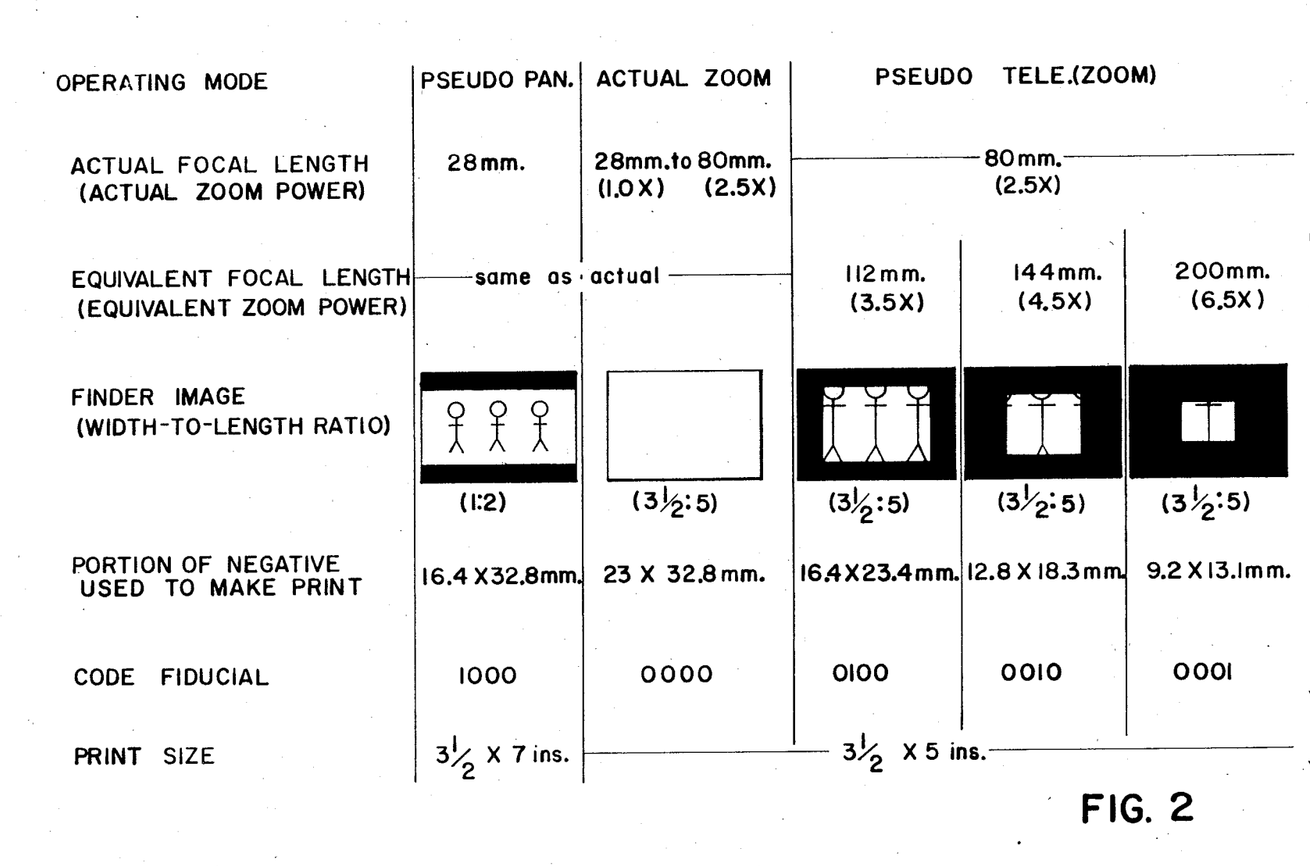
FIG. 2 is a chart for explaining how the camera is operated to enable pseudo panoramic prints and pseudo telephoto prints to be obtained from normal exposures coded to identify the selected type print, in accordance with a preferred embodiment of the invention.

Referring now to FIG. 2, there is shown a chart for understanding how the camera 1 is used to make exposures from which pseudo panoramic and pseudo telephoto prints as well as actual wide-angle to actual telephoto prints can be obtained. For the most part, the chart is self-explanatory. For example, when the cam ring 27 is in its pseudo panoramic setting, the actual focal length of the lens 3 is the wide angle limit 28 mm. The finder field 53 is masked as indicated, and the code fiducial 1000 is exposed on the film section F. During the printing operation, sensing of the code fiducial 1000 causes the negative to be masked along its upper and lower marginal zones in conformity with the masking of the finder field. An enlargement is made of the narrowed, unmasked portion of the negative, i.e., 16.4×32.8 mm., to provide a pseudo panoramic 3½×7 ins. print. When the cam ring 27 is in its 200 mm. pseudo telephoto setting, the actual focal length of the lens 3 is the telephoto limit 80 mm. The finder field 53 is masked as indicated, and the code fiducial 0001 is exposed on the film section F. During the printing operation, sensing of the code fiducial 0001 causes the negative to be masked along its upper, lower, left and right marginal zones in conformity with the masking of the finder field. An enlargement is made of the central, unmasked portion of the negative, i.e., 9.2×13.1 mm., to provide a pseudo telephoto 3½×5 ins. print. When the cam ring is rotated from its 28 mm. setting to its 80 mm. setting or vice-versa, the focal length of the lens is continuously changed between 28 mm. and 80 mm. The finder field is not masked and no code fiducial (0000) is exposed on the film section.

Figure 7:
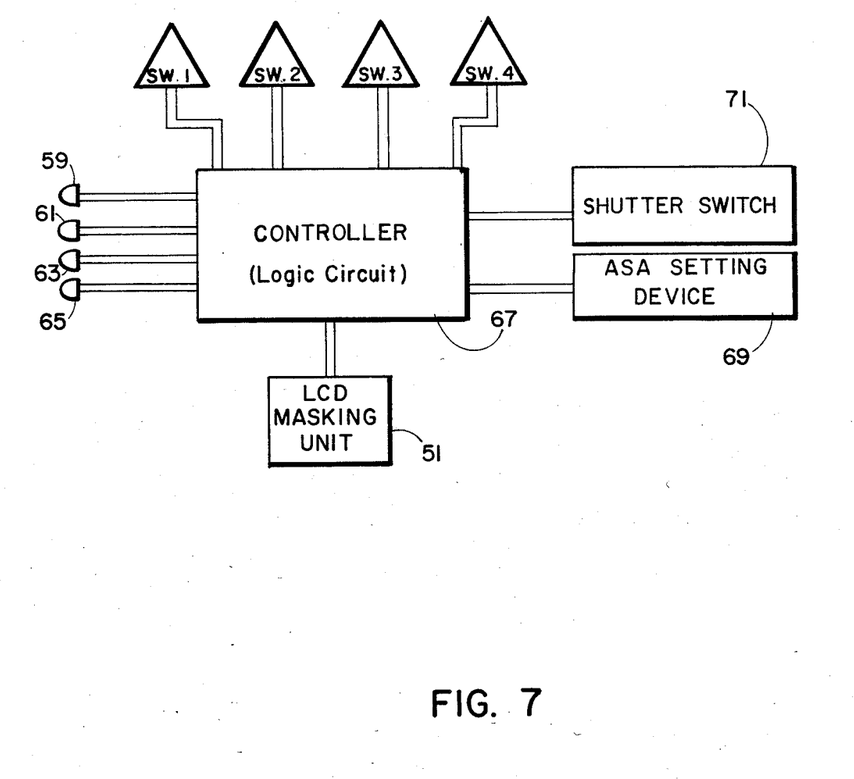
FIG. 7 is a schematic diagram of control circuitry in the camera.

FIG. 7 depicts known controller means 67, that is, a logic circuit, for operating the LCD masking unit 51 and selectively energizing the LED's 59, 61, 63 or 65 in response to closing of the switches SW1, SW2, SW3 or SW4. An ASA (film speed) setting device 69 is connected to the controller 67 to limit the intensity of an energized LED in accordance with the film speed of the 35 mm. film loaded in the camera 1. A shutter switch 71 is connected to the controller 67 to delay energization of an LED, even though one of the switches SW1–SW4 is closed, until the focal plane shutter is opened to permit an exposure. When the focal plane shutter is opened, the shutter switch 71 is closed to energize an LED. Conversely, closing of the focal plane shutter causes the shutter switch 71 to re-open, thereby de-energizing the LED.

While the invention has been described with reference to a preferred embodiment, it will be understood that various modifications may be effected within the ordinary skill in the art without departing from the scope of the invention.

I claim:

1. A photographic camera for enabling pseudo telephoto prints to be obtained from normal exposures, said camera comprising:
    objective lens means adjustable to change its focal length to vary its angular field of view of said lens means;
    manually operated means supported for movement to a plurality of positions corresponding to respective focal lengths of said lens means, for adjusting the lens means to a selected focal length to take an exposure, and supported for movement to at least one other position corresponding to a pseudo focal length associated with a different field of view narrower than the possible fields view of said lens means, when said lens means is adjusted to predetermined focal length; and
    code means, responsive to movement of said manually operated means to a position corresponding to a pseudo focal length, for encoding an exposure with indicia representative of the pseudo focal length, whereby a portion of the exposure covered by the angular field of view associated with the pseudo focal length can be identified to obtain a pseudo telephoto print.

2. A camera as recited in claim 1, wherein said predetermined focal length is the longest focal length of said lens.

3. A camera as recited in claim 1, wherein said manually operated means includes cam means coupled to said objective lens means and movable with the manually operated means to adjust the lens means to respective focal lengths, said cam means having dwell means for permitting said lens means to remain stationary in the predetermined focal length as said manually operated means is moved with said cam means to a position corresponding to a pseudo focal length.

4. A photographic camera for enabling pseudo telephoto prints to be obtained from normal exposures, said camera comprising:
    an objective lens adjustable to vary its focal length;
    manually operated means, supported for movement to a plurality of positions corresponding to respective focal lengths of said lens, for adjusting the lens to a selected focal length to take an exposure, and supported for movement to other positions corresponding to respective pseudo focal lengths longer than the possible focal lengths of said lens, when the lens is adjusted to its longest focal length; and
    code means, responsive to movement of said manually operated means to a position corresponding to a pseudo focal length, for encoding an exposure taken with said lens at its longest focal length with indicia representative of the pseudo focal length, whereby a pseudo telephoto print can be obtained from a portion of the exposure.

5. In a photographic camera for taking successive exposures, the combination comprising:
    an objective lens adjustable to vary its angular field of view within a field range having a wide angle limit and a telephoto limit;
    manually operated means, supported for movement to a plurality of positions corresponding to respective fields of view within said field range of said lens, for adjusting the lens to a selected field of view, and supported for movement to other positions corresponding to respective pseudo fields of view outside said field range, when said lens is adjusted to said wide angle limit or said telephoto limit; and
    code means, responsive to movement of said manually operated means to a position corresponding to a pseudo field of view, for encoding an exposure with indicia representative of the pseudo field.

6. The combination as recited in claim 5, wherein said manually operated means includes cam means coupled to said objective lens and movable with the manually operated means to adjust the lens to respective fields of view within the field range of said lens, said cam means having an elongate camming section and respective dwell sections at opposite ends of said camming section for permitting said lens to remain stationary at said wide angle limit and said telephoto limit as said manually operated means is moved with said cam means to the positions corresponding to the pseudo fields of view outside the field range of said lens.

7. The combination as recited in claim 5, wherein a pseudo field of view beyond said telephoto limit has the same aspect ratio as a field of view within the field range of said lens and a pseudo field of view beyond said wide angle limit has a larger aspect ratio than a field of view within said field range.

8. In a zoom lens for use with a camera having code means activatable to encode indicia on film, wherein manually operated means adjusts said lens to vary its angular field of view within a field range having a wide angle limit and a telephoto limit, the improvement comprising:
  means supporting said manually operated means for movement to a plurality of positions corresponding to respective fields of view within said field range, to adjust said lens to a selected field of view, and for movement to other positions corresponding to pseudo fields of view outside said field range, when said lens is adjusted to said wide angle limit or said telephoto limit; and
  means for connecting the code means of the camera and said manually operable means to activate the code means to encode indicia on film representative of a pseudo field of view in accordance with the position of the manually operable means.

9. A photographic camera for enabling pseudo panoramic prints and pseudo telephoto prints to be obtained from normal exposures coded to identify the selected type print, said camera comprising:
  an objective lens adjustable to vary its angular field of view within a field range having a wide angle limit and a telephoto limit;
  manually operated means, supported for movement to a plurality of positions corresponding to respective fields of view within said field range of said lens, for adjusting the lens to a selected field of view to take an exposure, and supported for movement to other positions corresponding to respective pseudo panoramic or pseudo telephoto fields of view outside said field range, when said lens is adjusted to said wide angle limit or said telephoto limit; and
  code means, responsive to movement of said manually operated means to a position corresponding to a pseudo panoramic or pseudo telephoto field of view, for encoding an exposure taken with said lens at its wide angle or telephoto limit with indicia representative of the pseudo field of view, whereby a portion of the exposure covered by the pseudo field can be identified to obtain a pseudo panoramic or pseudo telephoto print.

10. A camera as recited in claim 9, wherein a pseudo panoramic field of view has a width-to-length ratio of 1:2 and a pseudo telephoto field of view has a width-to-length ratio of 3½:5.

* * * * *